US010203469B2

United States Patent
Byon et al.

(10) Patent No.: US 10,203,469 B2
(45) Date of Patent: Feb. 12, 2019

(54) AUTO FOCUS LOCKING UNIT AND PHOTOGRAPHING APPARATUS INCLUDING THE SAME

(71) Applicant: Samsung Electronics Co., Ltd., Suwon-si, Gyeonggi-do (KR)

(72) Inventors: Kwang-seok Byon, Yongin-si (KR); Jung-soo Kim, Suwon-si (KR); Chi-young Park, Suwon-si (KR); Young-jae Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 15/115,032

(22) PCT Filed: Dec. 15, 2014

(86) PCT No.: PCT/KR2014/012310
§ 371 (c)(1),
(2) Date: Jul. 28, 2016

(87) PCT Pub. No.: WO2015/141930
PCT Pub. Date: Sep. 24, 2015

(65) Prior Publication Data
US 2016/0341926 A1     Nov. 24, 2016

(30) Foreign Application Priority Data
Mar. 18, 2014 (KR) .................. 10-2014-0031793

(51) Int. Cl.
*G02B 7/10* (2006.01)
*G02B 7/08* (2006.01)
(Continued)

(52) U.S. Cl.
CPC ............ *G02B 7/08* (2013.01); *G02B 27/646* (2013.01); *G02B 7/04* (2013.01); *G02B 7/10* (2013.01);
(Continued)

(58) Field of Classification Search
CPC ........................................................ G02B 7/10
(Continued)

(56) References Cited

U.S. PATENT DOCUMENTS 6,733,191 B2   5/2004   Oh et al.
6,816,674 B2   11/2004   Terao
(Continued)

FOREIGN PATENT DOCUMENTS

JP     2009-192815 A    8/2009
KR    2001-0036058 A    5/2001
KR    10-2004-0019860 A   3/2004

*Primary Examiner* — Clayton E Laballe
*Assistant Examiner* — Kevin Butler
(74) *Attorney, Agent, or Firm* — Jefferson IP Law, LLP

(57) ABSTRACT

Provided are an auto focus (AF) locking unit and a photographing apparatus including the AF locking unit. In particular, the AF locking unit supports a lens group barrel holder that is descended by a movement of a front barrel in an optical axis direction by using a locking lever provided with an elastic force, and the photographing apparatus includes the AF locking unit. According to an embodiment, the AF locking unit supports the lens group barrel holder including lenses in the optical axis direction by using a driving force transmitted from a motor in correspondence to movements of a cam barrel and a front barrel, and the photographing apparatus includes the AF locking unit.

16 Claims, 10 Drawing Sheets

(51) Int. Cl.
  *G02B 27/64* (2006.01)
  *G02B 7/04* (2006.01)
  *G03B 15/05* (2006.01)
  *G03B 15/12* (2006.01)

(52) U.S. Cl.
  CPC .............. *G02B 7/102* (2013.01); *G03B 15/05* (2013.01); *G03B 15/12* (2013.01)

(58) Field of Classification Search
  USPC .......................................................... 396/83
  See application file for complete search history.

(56) References Cited

U.S. PATENT DOCUMENTS

| | | |
|---|---|---|
| 7,123,290 B2 | 10/2006 | Ohishi |
| 7,835,088 B2 | 11/2010 | Nomura et al. |
| 8,041,204 B2 * | 10/2011 | Nomura ................. G02B 7/026 359/813 |
| 8,117,936 B2 | 2/2012 | Nomura et al. |
| 2009/0125926 A1 | 5/2009 | Nomura |

* cited by examiner

[Fig. 1]
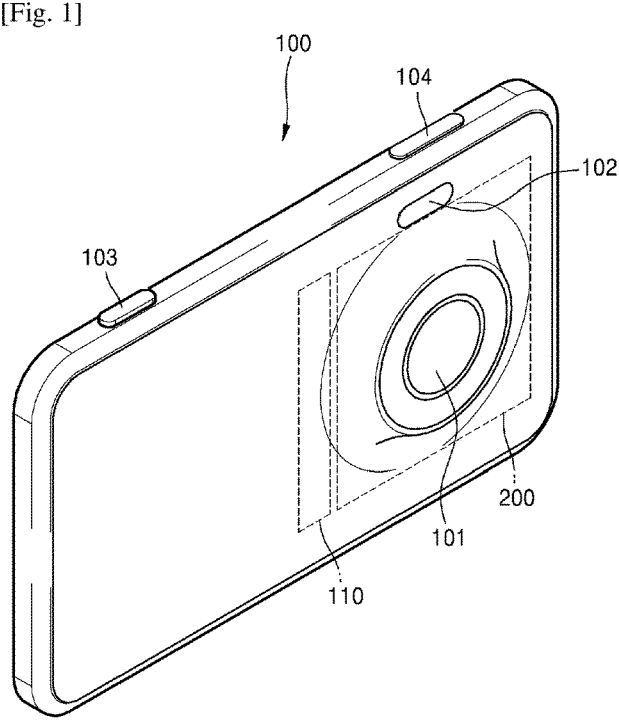
[Fig. 2]
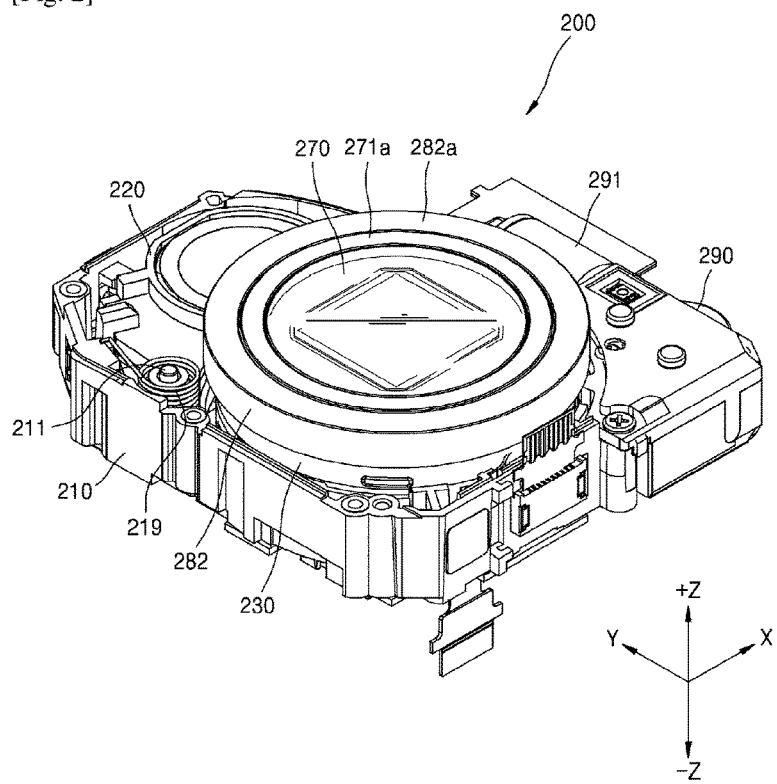

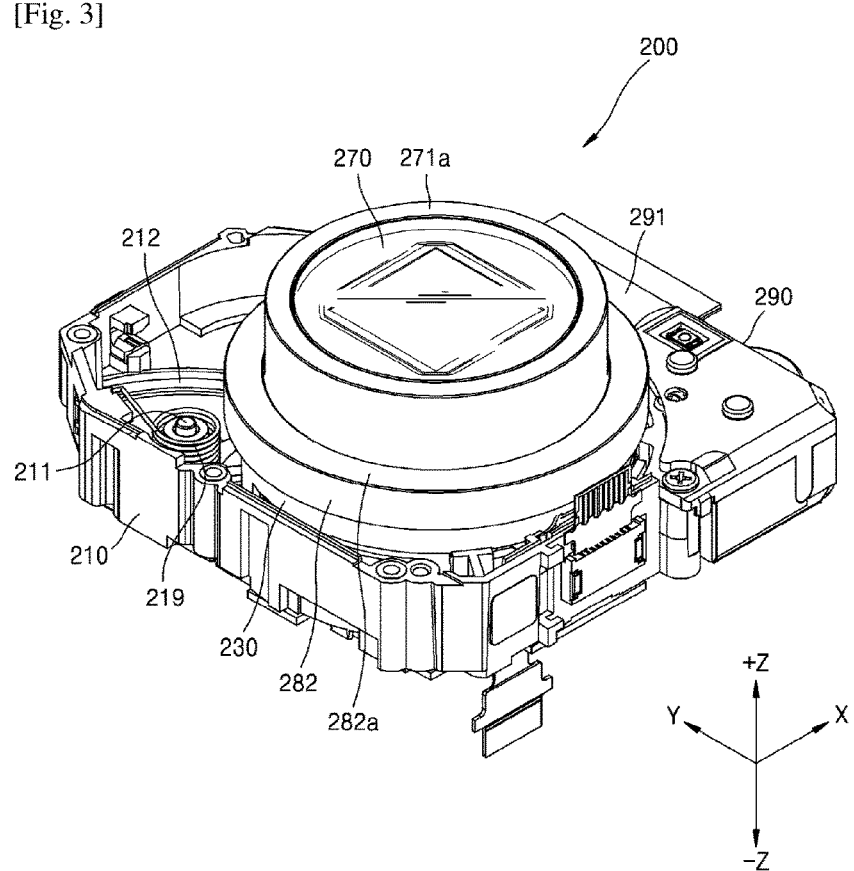
[Fig. 3]

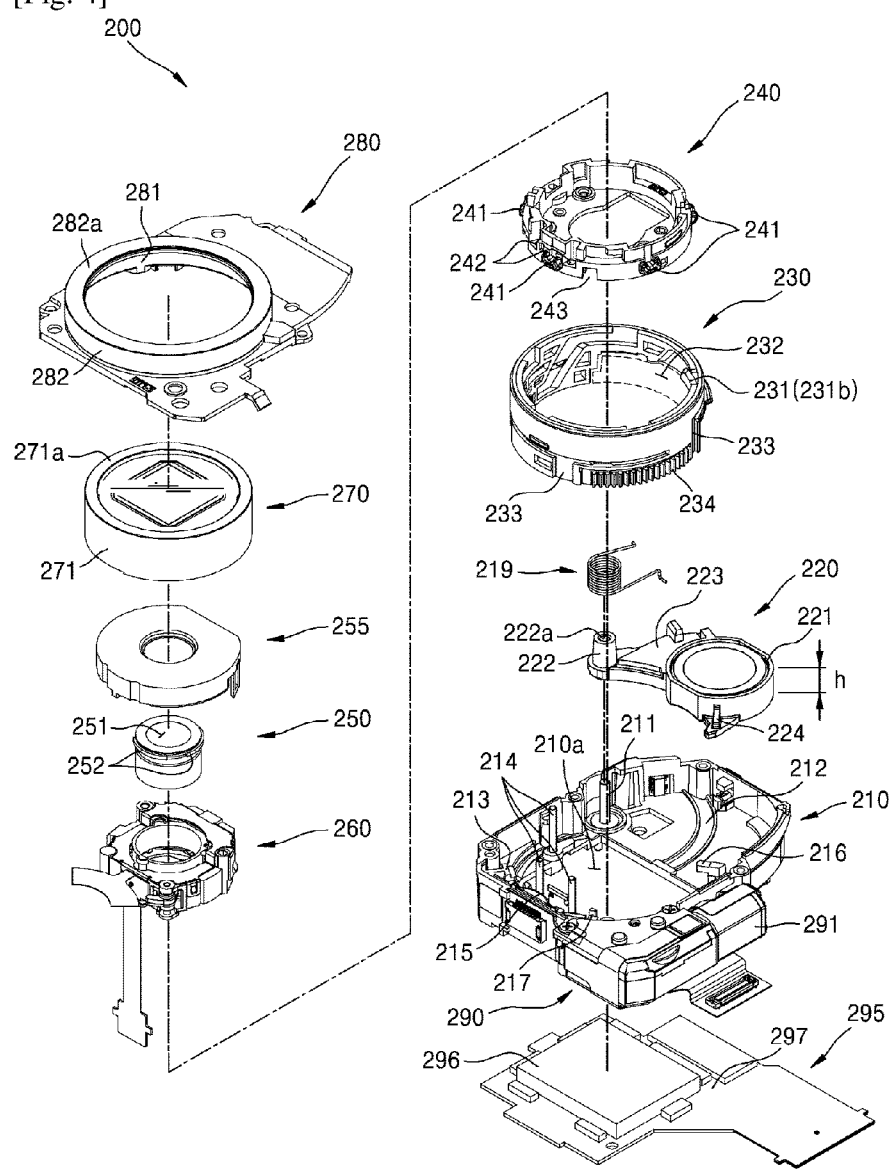
[Fig. 4]

[Fig. 5]
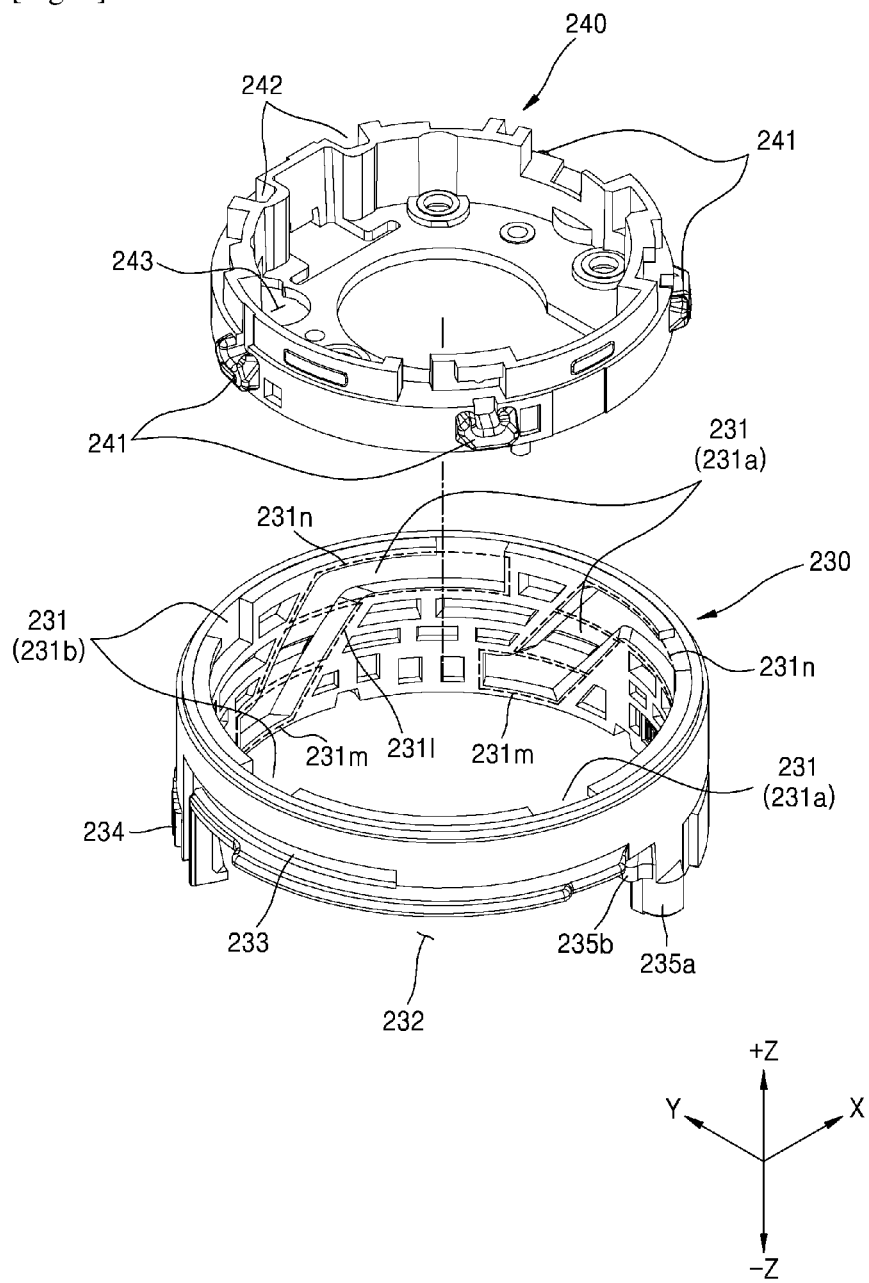

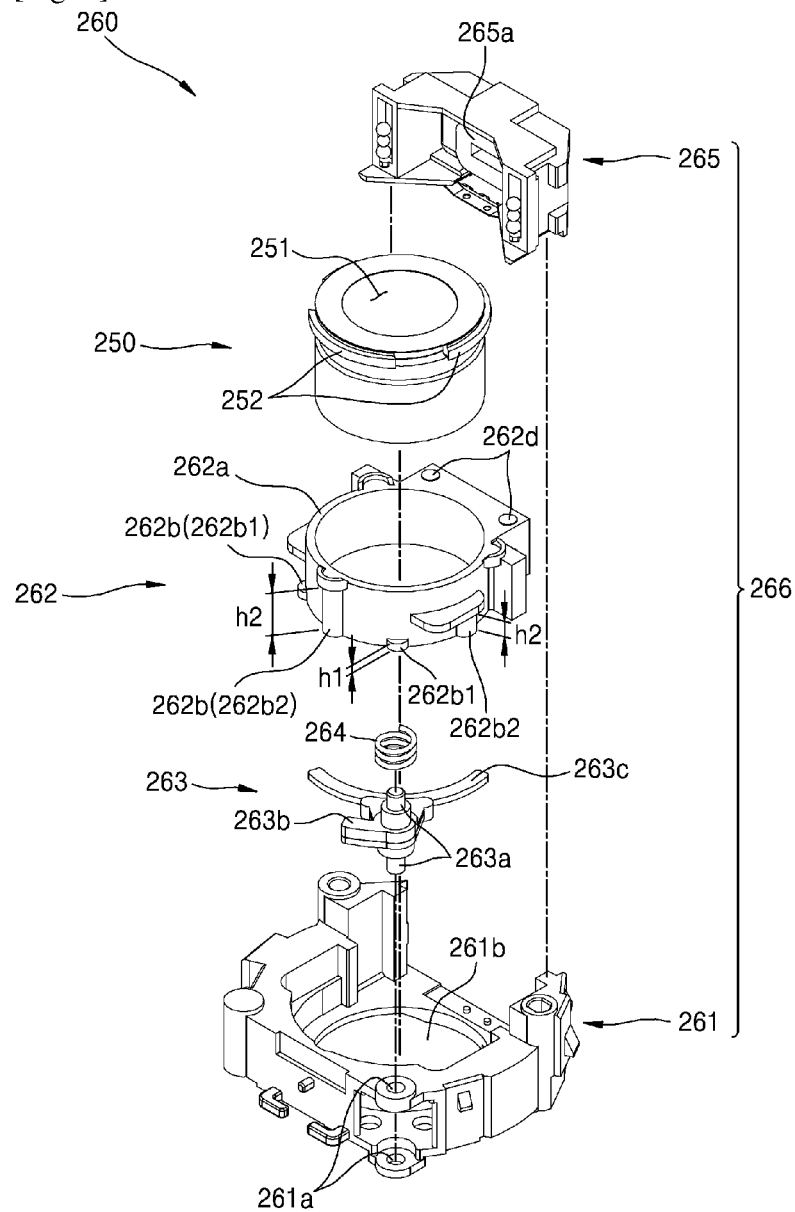

[Fig. 7A]
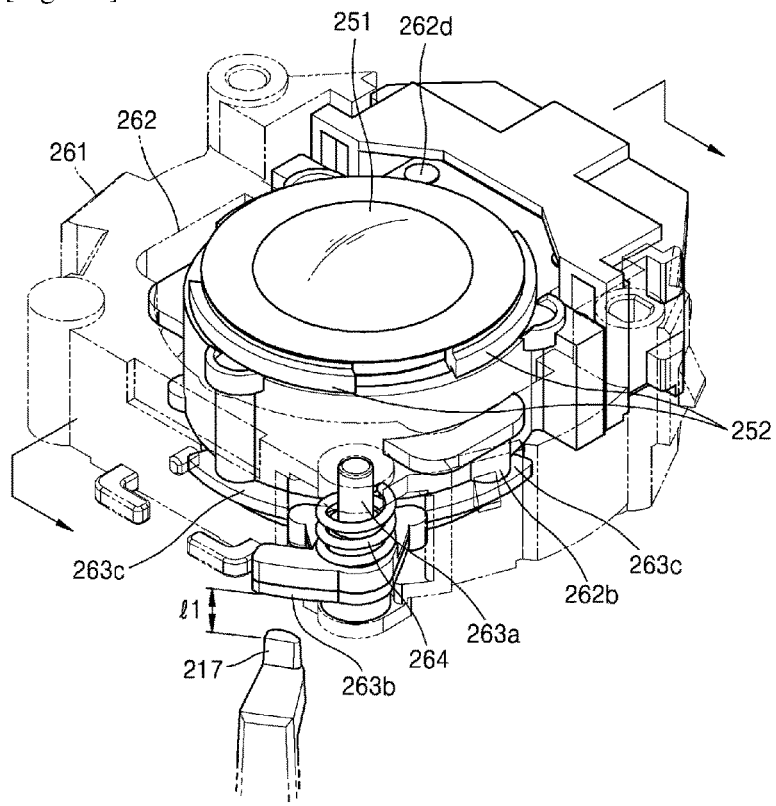
[Fig. 7B]
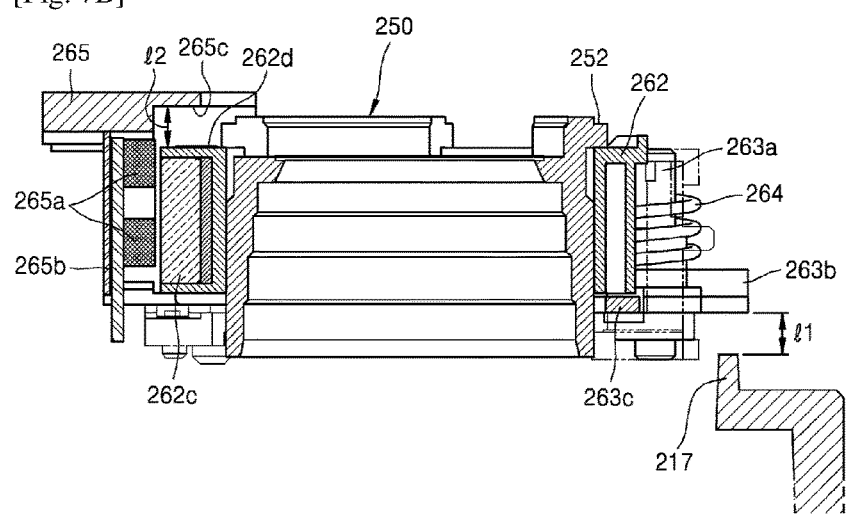

[Fig. 8A]
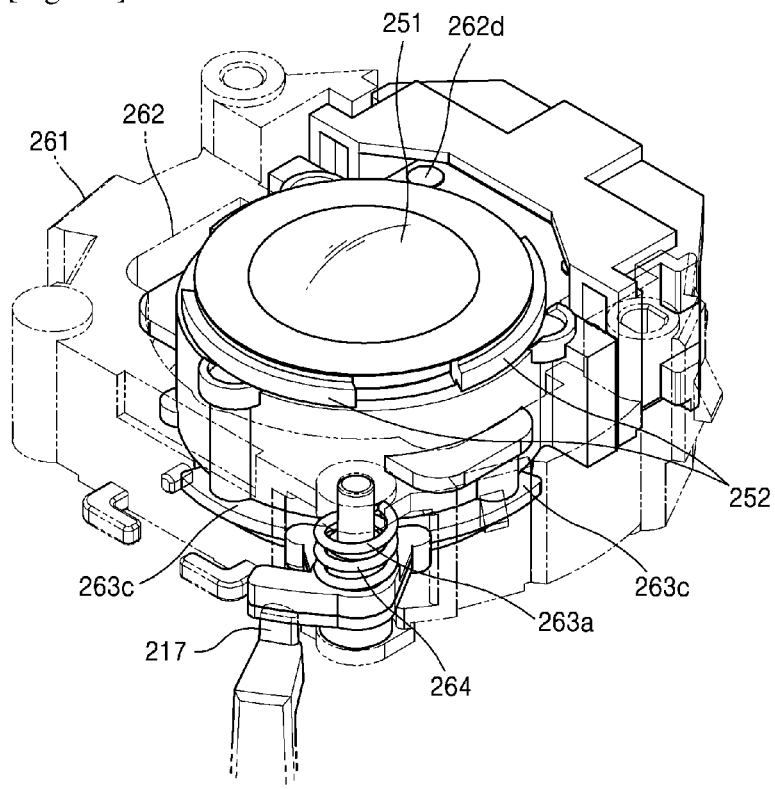
[Fig. 8B]
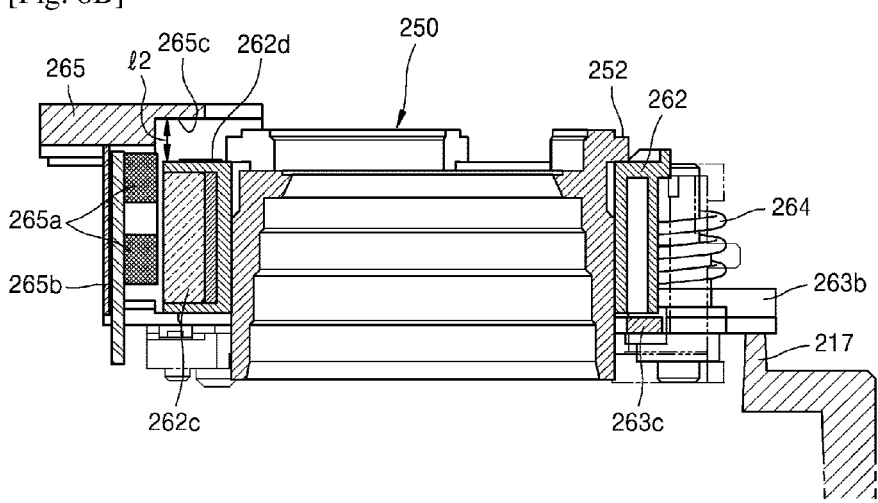

[Fig. 9A]
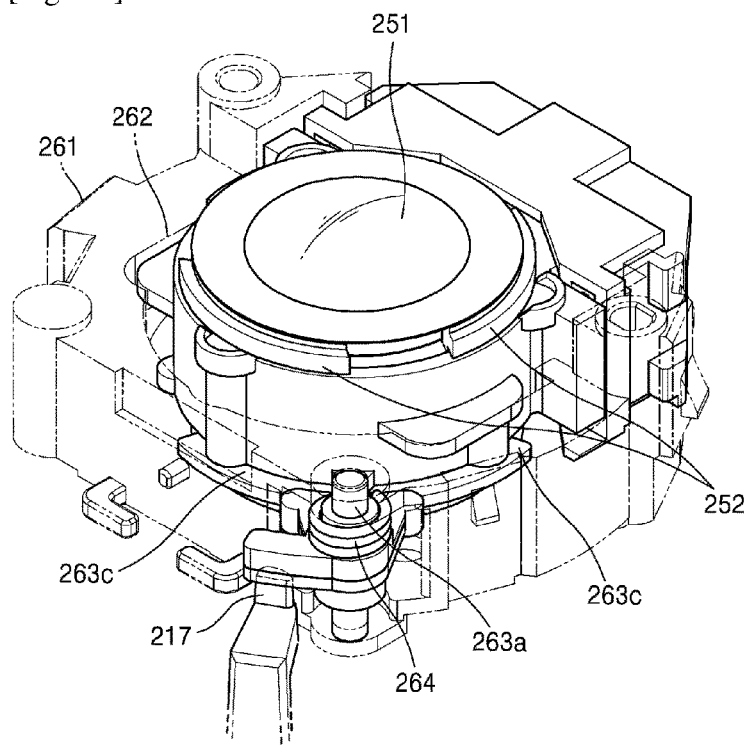
[Fig. 9B]
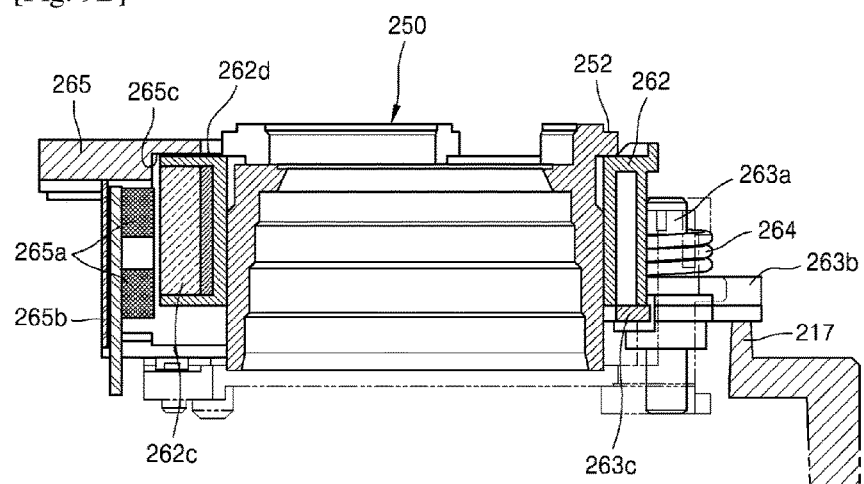

[Fig. 10A]
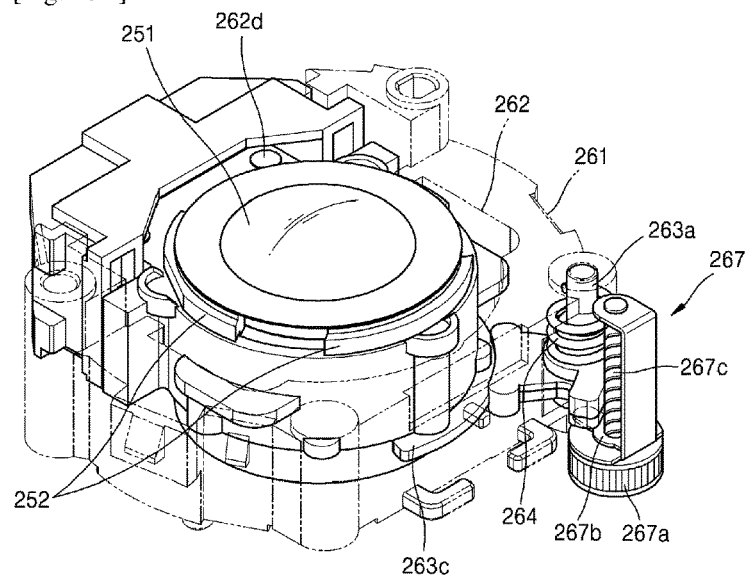
[Fig. 10B]
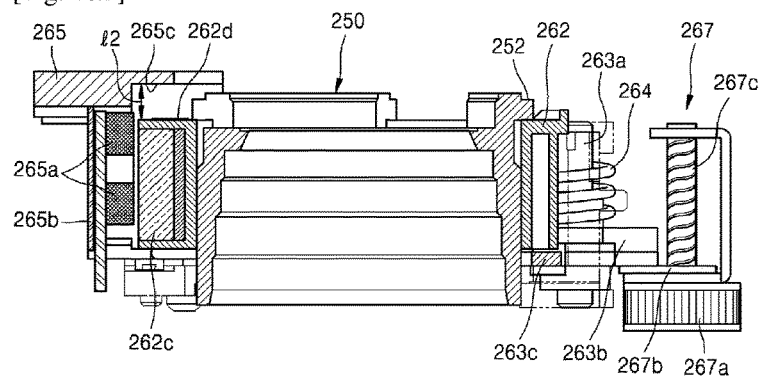
[Fig. 11A]
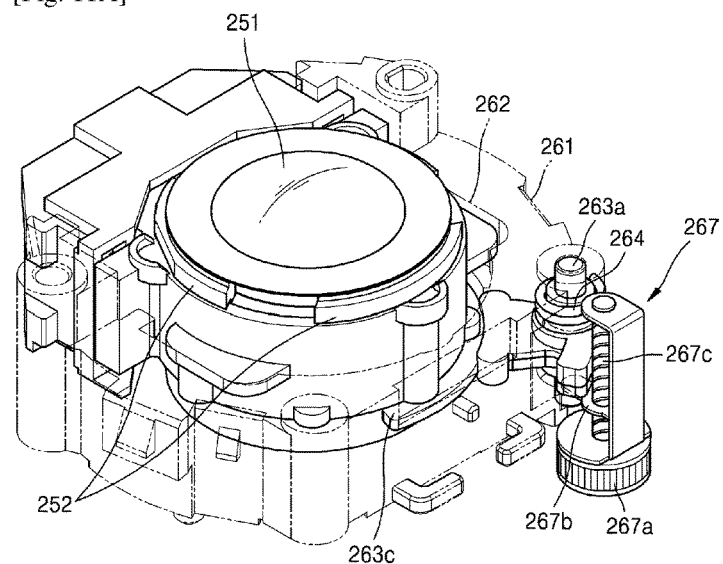

[Fig. 11B]
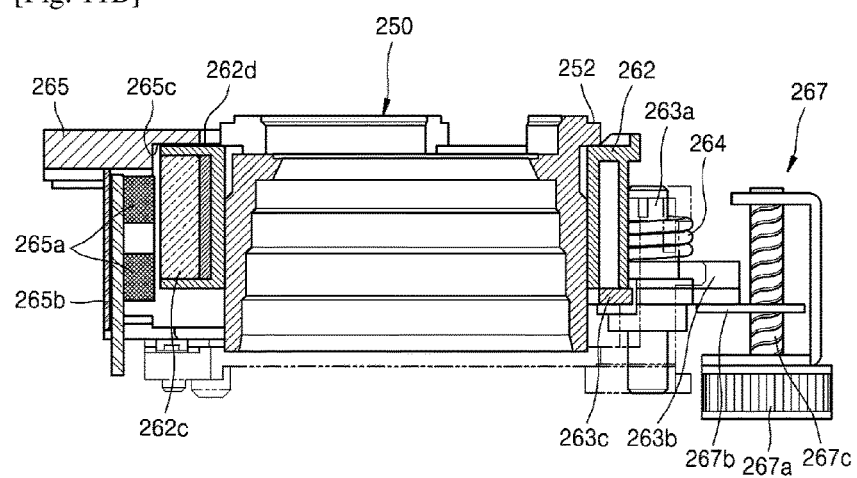

AUTO FOCUS LOCKING UNIT AND PHOTOGRAPHING APPARATUS INCLUDING THE SAME

TECHNICAL FIELD

One or more embodiments of the present invention relate to an auto focus (AF) locking unit and a photographing apparatus including the AF locking unit, and more particularly, to an AF locking unit supporting a lens group barrel holder that receives lenses descending in correspondence with a movement of a front barrel by using a locking lever in an optical axis direction, and a photographing apparatus including the AF locking unit.

BACKGROUND ART

Owing to developments in technology, a photographing apparatus may provide various and complicated functions. A photographing apparatus has to focus on a subject that is an object to be photographed. The number of lenses and weight of lenses increase in proportion to the magnitude and pixel resolution, and a stroke (or moving distance) of a lens in an optical axis direction (z-axis direction) is increasing.

In order to prevent shaking of a lens and/or shock applied to a lens due to an external force, movement of a lens group barrel holder in an optical axis direction may be restricted by using a magnet, a coil, and a yoke. The magnet, the coil, and the yoke are driven by using a battery of the photographing apparatus. Thus, when a binding force for restricting the movement of the lens group barrel holder in the optical axis direction by using the magnet, the coil, and the yoke is increased, battery life of the photographing apparatus is reduced.

DISCLOSURE OF INVENTION

Technical Problem

One or more embodiments of the present invention include an auto focus (AF) locking unit supporting a lens group barrel holder in an optical axis direction by using a rotation of a cam barrel, and a photographing apparatus including the AF locking unit.

One or more embodiments of the present invention includes an AF locking unit supporting a lens group barrel holder that is descends by rotation of a cam barrel in an optical axis direction by using a locking lever that is provided with an elastic force, and a photographing apparatus including the AF locking unit.

One or more embodiments of the present invention includes an AF locking unit supporting a lens group barrel holder that descends corresponding to rotation of a cam barrel in an optical axis direction by using a locking lever contacting a fixing protrusion, and a photographing apparatus including the AF locking unit.

One or more embodiments of the present invention includes an AF locking unit supporting a semi-circular protrusion of a lens group barrel holder descending in correspondence to rotation of a cam barrel in an optical axis direction by using a locking lever protrusion contacting a fixed protrusion and a locking plate separated from the locking lever protrusion, and a photographing apparatus including the AF locking unit.

One or more embodiments of the present invention includes an AF locking unit supporting a lens group barrel holder in an optical axis direction by using a locking plate contacting a part of a semi-circular protrusion of the lens group barrel holder that is descended, and a photographing apparatus including the AF locking unit.

One or more embodiments of the present invention includes an AF locking unit, in which a locking lever elastic member provides a locking lever with maximum elastic force when a lens group barrel holder reaches an accommodation location, and a photographing apparatus including the AF locking unit.

One or more embodiments of the present invention includes an AF locking unit, in which a distance between a front surface of a lens group barrel holder and an inner side surface of a ball guide is reduced less than that of a case where the lens group barrel holder reaches a protruding location in correspondence to a compressive transformation length of a locking lever elastic member when the lens group barrel holder reaches an accommodation location, and a photographing apparatus including the AF locking unit.

One or more embodiments of the present invention includes an AF locking unit supporting a lens group barrel holder in an optical axis direction, and a photographing apparatus including the AF locking unit.

Additional aspects will be set forth in part in the description which follows and, in part, will be apparent from the description, or may be learned by practice of the presented embodiments.

Solution to Problem

According to one or more embodiments of the present invention, an auto focus (AF) locking unit including: a locking protrusion; a locking lever provided in an AF frame accommodating a lens group barrel holder including lenses to be moved in an optical axis direction, and supporting the lens group barrel holder by contacting the locking protrusion when the AF frame is moved to an accommodation location that is adjacent to an image sensor; and a locking lever elastic member providing an elastic force in the optical axis direction to the locking lever in correspondence to the contact between the locking protrusion and the locking lever, wherein when the AF frame is moved toward the accommodation location, a distance between a front surface of the lens group barrel holder and an inner side surface of the AF frame, which faces the front surface of the lens group barrel holder, is reduced.

The front surface of the lens group barrel holder and the inner side surface of the AF frame may contact each other at the accommodation location.

A boss may be provided on the front surface of the lens group barrel holder to contact the inner side surface of the AF frame that is at the accommodation location, and a protrusion that is supported by the locking lever may be provided on an outer circumferential surface of the lens group barrel holder.

When the lens group barrel holder reaches the accommodation location, the locking lever elastic member may provide the locking lever with maximum elastic force.

The AF frame may have a protruding location that is separated farther from the image sensor than the accommodation location is, and the locking protrusion and the locking lever may be separated from each other at the protruding location.

The AF frame may have a contact location where the locking protrusion and the locking lever contact each other when the AF frame is moved to the accommodation location, and the locking protrusion and the locking lever may be separated from each other between the protruding location and the contact location.

The locking lever elastic member may be elastically transformed while the AF frame is moved between the contact location and the accommodation location.

The locking lever may include: a locking lever shaft supported by the AF frame to be moved in the optical axis direction; a locking lever protrusion extending from the locking lever shaft and contacting the locking protrusion; and a locking plate extending from the locking lever shaft in two branches in a circumferential direction of the lens group barrel holder to support the lens group barrel holder.

An angle between the two branches of the locking plate divided from the locking lever shaft may be 180° or less.

The AF frame may have a protruding location that is separated farther from the image sensor than the accommodation location is, and a distance between the locking lever and the locking protrusion may be greater than a distance between the front surface of the lens group barrel holder and the inner side surface of the AF frame at the protruding location.

According to one or more embodiments of the present invention, an auto focus (AF) locking unit includes: a movable locking protrusion; a locking motor for moving the movable locking protrusion in an optical axis direction; a locking lever provided in an AF frame accommodating a lens group barrel holder including lenses to be moved in the optical axis direction, and supporting the lens group barrel holder by contacting the movable locking protrusion; and a locking lever elastic member providing the locking lever with an elastic force in the optical axis direction in correspondence to the contact between the movable locking protrusion and the locking lever.

The AF frame may be moved between an accommodation location that is adjacent to an image sensor, and a protruding location separated farther from the image sensor than the accommodation location is, and when the AF frame is moved to the accommodation location, the locking lever may contact the movable locking protrusion, and a distance between a front surface of the lens group barrel holder and an inner side surface of the AF frame, which faces the front surface of the lens group barrel holder, may be reduced.

The AF frame may be moved between an accommodation location that is adjacent to an image sensor, and a protruding location separated farther from the image sensor than the accommodation location is, and when the AF frame may be at the accommodation location, the locking motor moves the movable locking protrusion to push the locking lever, and the distance between the front surface of the lens group barrel holder and the inner side surface of the AF frame, which faces the front surface of the lens group barrel holder, is reduced.

According to one or more embodiments of the present invention, a photographing apparatus includes: an image sensor; an auto focus (AF) assembly in which a lens group barrel holder including lenses is accommodated; and an AF locking unit.

The photographing apparatus may further include a lens driving assembly comprising a motor and moving the AF assembly in the optical axis direction with respect to the image sensor.

The lens driving assembly may include: a cam barrel comprising an opening and being rotated about the optical axis by a driving force transmitted from the motor; a front barrel accommodated in the cam barrel and moving the AF assembly in the optical axis direction in correspondence to the rotation of the cam barrel; and a first lens group assembly rotating between a home position separated from the optical axis and an alignment position arranged on the optical axis, wherein the first lens group assembly is moved between the home position and the alignment position through the opening by the rotation of the cam barrel and an elastic force.

Advantageous Effects of Invention

One or more embodiments of the present invention include an auto focus (AF) locking unit supporting a lens group barrel holder in an optical axis direction by using a rotation of a cam barrel, and a photographing apparatus including the AF locking unit.

One or more embodiments of the present invention includes an AF locking unit supporting a lens group barrel holder that is descends by rotation of a cam barrel in an optical axis direction by using a locking lever that is provided with an elastic force, and a photographing apparatus including the AF locking unit.

One or more embodiments of the present invention includes an AF locking unit supporting a lens group barrel holder that descends corresponding to rotation of a cam barrel in an optical axis direction by using a locking lever contacting a fixing protrusion, and a photographing apparatus including the AF locking unit.

One or more embodiments of the present invention includes an AF locking unit supporting a semi-circular protrusion of a lens group barrel holder descending in correspondence to rotation of a cam barrel in an optical axis direction by using a locking lever protrusion contacting a fixed protrusion and a locking plate separated from the locking lever protrusion, and a photographing apparatus including the AF locking unit.

One or more embodiments of the present invention includes an AF locking unit supporting a lens group barrel holder in an optical axis direction by using a locking plate contacting a part of a semi-circular protrusion of the lens group barrel holder that is descended, and a photographing apparatus including the AF locking unit.

One or more embodiments of the present invention includes an AF locking unit, in which a locking lever elastic member provides a locking lever with maximum elastic force when a lens group barrel holder reaches an accommodation location, and a photographing apparatus including the AF locking unit.

One or more embodiments of the present invention includes an AF locking unit, in which a distance between a front surface of a lens group barrel holder and an inner side surface of a ball guide is reduced less than that of a case where the lens group barrel holder reaches a protruding location in correspondence to a compressive transformation length of a locking lever elastic member when the lens group barrel holder reaches an accommodation location, and a photographing apparatus including the AF locking unit.

One or more embodiments of the present invention includes an AF locking unit supporting a lens group barrel holder in an optical axis direction, and a photographing apparatus including the AF locking unit.

Additional aspects will be set forth in part in the description which follows and, in part, will be apparent from the description, or may be learned by practice of the presented embodiments.

BRIEF DESCRIPTION OF DRAWINGS

These and/or other aspects will become apparent and more readily appreciated from the following description of the embodiments, taken in conjunction with the accompanying drawings in which:

FIG. 1 is a perspective view of a photographing apparatus according to an embodiment of the present invention;

FIG. 2 is a schematic perspective view of a lens driving assembly in a case where a first lens group assembly is located at a groove location in the photographing apparatus according to an embodiment of the present invention;

FIG. 3 is a schematic perspective view of a lens driving assembly when a first lens group assembly is located at an alignment position in the photographing apparatus according to an embodiment of the present invention;

FIG. 4 is an exploded perspective view of an element separated from a lens driving assembly of the photographing apparatus according to an embodiment of the present invention;

FIG. 5 is a schematic perspective view of a front barrel and a cam barrel in a lens driving assembly in the photographing apparatus according to an embodiment of the present invention;

FIG. 6 is an exploded perspective view of an element separated from an auto focus (AF) assembly in the photographing apparatus according to an embodiment of the present invention;

FIGS. 7A and 7B are respectively a schematic perspective view and a cross-sectional view of an AF assembly when a locking protrusion and a locking lever protrusion are separated from each other in the photographing apparatus according to an embodiment of the present invention;

FIGS. 8A and 8B are respectively a schematic perspective view and a cross-sectional view of an AF assembly when a locking protrusion and a locking lever protrusion initially contact each other in the photographing apparatus according to an embodiment of the present invention;

FIGS. 9A and 9B are respectively a schematic perspective view and a cross-sectional view of an AF assembly when a locking protrusion compresses the locking lever protrusion in the photographing apparatus according to an embodiment of the present invention;

FIGS. 10A and 10B are respectively a schematic perspective view and a cross-sectional view of an AF assembly when a moving protrusion and a locking lever protrusion contact each other by an additional driving source in a photographing apparatus according to another embodiment of the present invention; and FIGS. 11A and 11B are respective a schematic perspective view and a cross-sectional view of an AF assembly when a moving protrusion compresses a locking lever protrusion by an additional driving source in a photographing apparatus according to another embodiment of the present invention.

MODE FOR THE INVENTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms 'first', 'second', 'third' etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept. For example, a first element may be designated as a second element, and similarly, a second element may be designated as a first element without departing from the teachings of the inventive concept.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a schematic perspective view of a photographing apparatus 100 according to an embodiment of the present invention.

Referring to FIG. 1, the photographing apparatus 100 includes a lens 101 and a flash 102 on a front surface thereof, and a display screen (not shown) and manipulation buttons (not shown, for example, a menu button, etc.) for controlling functions of the photographing apparatus 100 on a rear surface thereof. The photographing apparatus 100 may include a shutter button 103, a power button 104, and a strap holder (not shown) on side surfaces thereof between the front surface and the rear surface. Buttons included in the photographing apparatus 100 may be realized as touch buttons, as well as physical buttons. Also, the photographing apparatus 100 may include a control unit (processor) 110 for controlling driving of the photographing apparatus 100 or a motor, and a battery (not shown) supplying electric power to the photographing apparatus 100.

The photographing apparatus 100 may include a mobile phone, a smartphone, a tablet personal computer (PC), a digital camera, a camcorder, a digital single-lens reflex (DSLR) camera, or a mirror-less camera. Also, the photographing apparatus 100 may include an electronic device (not shown) that is capable of capturing still images and/or moving pictures by using at least one lens or at least one lens group assembly. The photographing apparatus 100 may be integrally formed with the electronic device (not shown) or may be separated from the electronic device (not shown). For example, the photographing apparatus 100 of detachable type may be connected to the electronic device (not shown) through wires or wirelessly, and may transmit and receive data that is captured and/or stored therein in advance (for example, still images or moving pictures) to and from the electronic device (not shown).

The photographing apparatus 100 may include the control unit 110 and a lens driving assembly 200 including a plurality of lenses and/or a plurality of lens groups. Although the control unit 110 is not shown in detail in FIG. 1, the control unit 110 is electrically connected to components of the photographing apparatus 100, including the lens driving assembly 200. The control unit 110 may include a processor (not shown), a read only memory (ROM, not shown) storing a program for controlling the photographing apparatus 100, and a random access memory (RAM, not shown) for storing signals or data input from outside the photographing apparatus 100 or storing various tasks performed in the photographing apparatus 100. The control unit 110 may be configured as a micro chip or a circuit board including a micro chip, and the components included in the control unit 110 may be realized by software and/or circuits built into the control unit 110.

The control unit 110 controls overall operations of the photographing apparatus 100 and signal flows between the components of the photographing apparatus 100, and processes data. Also, if there is a user input or conditions that are set and stored in advance are satisfied, the control unit 110 may execute an operating system (OS) and various applications.

FIG. 2 is a schematic perspective view of the lens driving assembly 200 when a first lens group assembly is located at a recess position in the photographing apparatus 100.

In FIG. 2, the lens driving assembly 200 is shown in a state where a front cap 280 (see FIG. 4) is partially uncapped. FIG. 2 schematically shows the lens driving assembly 200 including a first lens group assembly 220 that is located at a home position in a case where the photographing apparatus 100 is in a power-off state and/or a selection of a camera application (not shown) (for example, selection of a short-cut icon corresponding to the camera application) is not transmitted from the photographing apparatus 100 (for example, in a case where the photographing apparatus 100 is in a first state).

Referring to FIG. 2, the lens driving assembly 200 includes a lens base 210, a first lens group assembly 220, a cam barrel 230, a front barrel 240 (see FIG. 4), a second lens group barrel 250 (see FIG. 4), a shutter module 255 (see FIG. 4), an auto focus (AF) assembly (see FIG. 4), a panel barrel 270, a front cap 280 (see FIG. 4), and a driving module 290 including a motor 291 and a gear train (not shown). The lens driving assembly 200 may include an image sensor module 295 (see FIG. 4) including an image sensor 296. The image sensor module 295 may be detached from or may be integral with the lens driving assembly 200.

If the photographing apparatus 100 is in the first state, the front barrel 240, the second lens group barrel 250, the shutter module 255, and the panel barrel 270 are arranged in an optical axis direction (−z axis direction) and accommodated in the cam barrel 230.

The optical axis (z-axis) in which the cam barrel 230, the front barrel 240, the second lens group barrel 250, the shutter module 255, and the panel barrel 270 are arranged may denote a lens center axis of the first lens group assembly 220, the second lens group barrel 250, and the image sensor 296 that are arranged in the photographing apparatus 100 that is in a second state.

If the photographing apparatus 100 is in the first state, the first lens group assembly 220 is located at a home position that is a location before moving to the alignment position based on an axis 211 fixed on the lens base 210. The home position is a location where the first lens group assembly 220 separated from the optical axis does not interfere with photographing of the photographing apparatus 100.

The photographing apparatus 100 according to another embodiment of the present invention may capture still images and/or moving pictures by using the second lens group barrel 250 and the image sensor 296 arranged in the optical axis, except for the first lens group assembly 220 located at the home position.

The alignment location of the first lens group assembly 220 may denote a location (for example, an optical request location) at which a lens center axis (for example, the optical axis) of the first lens group assembly 220 rotated based on an axis 211 by an elastic member, for example, a spring 219, and a lens center axis of the second lens group barrel 250 that is reciprocating are arranged. The alignment location is a location where the first lens group assembly 220 arranged in the optical axis interferes with the photographing operation of the photographing apparatus 100. The optical request location may denote a location where optical performances of the components in the lens driving assembly 200 may be exhibited for capturing the still images and/or the moving pictures by the photographing apparatus 100.

The alignment location may include a location where a distance between the lens center axis of the first lens group assembly 220 and the lens center axis of the second lens group barrel 250 is 2 mm or less. An inclination of the lens center axis may be equal to that of the optical axis. Also, the lens center axis may coincide with the optical axis or may be in parallel with the optical axis.

From among the components accommodated in the lens driving assembly 200, a surface 271a of a ring 271 (for example, a surface 271a of the ring 271 crossing the optical axis) of the panel barrel 270 may be located lower than a surface 282a of a front cap ring 282 (for example, a surface of the cap ring 282 crossing the optical axis) based on a bottom of the lens base 210 (for example, 0.01 mm to 3 mm lower). Since the surface 271a of the ring 271 is lower than the surface 282a of the front cap ring 282, other components accommodated in the lens driving assembly 200 (for example, the cam barrel 230, the front barrel 240, the second lens group barrel 250, and/or the shutter module 255) may be lower than a height of the front cap ring 282. If the ring 271 of the panel barrel 270 is accommodated to be lower than the front cap ring 282, the components (for example, the cam barrel 230, the front barrel 240, the second lens group barrel 250, and the shutter module 255) may be protected against an external force applied from a direction crossing the optical axis, as well as the external force applied from the optical axis direction.

FIG. 3 is a schematic perspective view of the lens driving assembly 200 in a case where the first lens group assembly 220 is located at an alignment position in the photographing apparatus 100 according to an embodiment of the present invention.

FIG. 3 schematically shows the lens driving assembly 200 in a state where the front cap 280 (see FIG. 4) is partially uncapped, similarly to FIG. 2. In FIG. 3, in a case where the photographing apparatus 100 is booted and/or a selection of a camera application (not shown) (for example, selection of a short-cut icon corresponding to the camera application) is input to the photographing apparatus 100 (for example, in a case where the photographing apparatus 100 is in a second state), the lens driving assembly 200 is located at an alignment position. At the alignment position, the first lens group assembly 220 and the second lens group barrel 250 of the lens driving assembly 200 are aligned in the optical axis (z-axis).

When the photographing apparatus 100 is in the second state, a driving force generated by a motor 291 of the driving module 290 is transferred to a gear train (not shown) of the driving module 290. The cam barrel 230 starts to rotate about the optical axis due to the driving force transmitted to a gear 234 of the cam barrel 230 via the gear train (not shown).

When the cam barrel 230 rotates, the front barrel 240, the lens group barrel 250, the shutter module 255, and the panel barrel 270 accommodated in the cam barrel 230 are moved in an optical axis direction (+z direction). Due to the elastic force of the spring 219, the first lens group assembly 220 are pivoted to be aligned in the optical axis direction through an opening 232 (see FIG. 4) of the cam barrel 230 that rotates. The first lens group assembly 220 that pivots is guided by a lens base guide recess 212 (see FIG. 4) formed in the lens base 210. The first lens group assembly 220 may be guided by a first lens group guide protrusion (not shown) located on a lower end of the first lens group assembly 220 and the lens base guide recess 212 to be pivoted. Due to the elastic force of the spring 219, the first lens group assembly 220 may pivot to the alignment position. The pivoting of the first lens group assembly 220 may be finished within, for example, ±1.5 sec., based on rotation finish of the cam barrel 230.

Hereinafter, operations of the first lens group assembly 220, the cam barrel 230, and/or the front barrel 240 at the home position and the alignment position will be described in detail with reference to FIG. 4.

FIG. 4 is an exploded perspective view schematically showing components of the lens driving assembly 200 in the photographing apparatus 100 according to an embodiment of the present invention.

Referring to FIG. 4, the lens driving assembly 200 includes the lens base 210, the first lens group assembly 220, the cam barrel 230, the front barrel 240, the second lens group barrel 250, the shutter module 255, the panel barrel 270, the front cap 280, and the driving module 290 including the motor 291 and the gear train (not shown). Also, the lens driving assembly 200 may include the image sensor module 295 including the image sensor 296.

The lens base 210 includes a shaft 211, the lens base guide recess 212, a plurality of fixing protrusions 213, a plurality of guide bars 214, a plate spring 215, a first stopper 216, a second stopper (not shown), a locking protrusion 217, and an image sensor opening 210a.

The shaft 211 may be an axis of an elastic pivot of the first lens group assembly 220. A location of the shaft 211 may be determined in consideration of a size of the lens driving assembly 200, a size of the cam barrel 230 (for example, including an inner diameter and an outer diameter), and moving distance and/or rotating angle of the first lens group assembly 220. A center of the shaft 211 may be located within a virtual rectangular area (not shown) that contacts an outer diameter of the cam barrel 230. If the center of the shaft 211 is located within the virtual rectangular area (not shown) contacting the outer diameter of the cam barrel 230, the size of the lens driving assembly 200 and the moving distance of the first lens group assembly 220 may be reduced, compared to a case where the center of the shaft 211 is located outside the virtual rectangular area (not shown) contacting the outer diameter of the cam barrel 230.

The spring 219 providing the first lens group assembly 220 with the elastic force may be located on a shaft insertion pillar 222 that is penetrated by the shaft 211. A hook at one end of the spring 219 may contact a connecting arm 223 of the first lens group assembly 220, and a hook at the other end of the spring 219 may contact a side surface of the lens base 210.

The lens base guide recess 212 guides the first lens group assembly 220 that elastically pivots to the home position and the alignment position. The lens base guide recess 212 may have a radius of curvature for guiding the first lens group assembly 220 to the home position and the alignment position. The lens base guide recess 212 having the radius of curvature is advantageous for reducing the size of the lens driving assembly 200, when it is compared with a lens base guide recess of a linear type. Also, the lens base guide recess 212 having a radius of curvature may reduce at least one selected from a moving velocity, a shock, and a vibration generated corresponding to arrival of the first lens group assembly 220 at the home position and the alignment location, when compared with a lens base guide recess (not shown) of a linear type. For example, one of the moving velocity, the shock, and the vibration, or a combination of the moving velocity, the shock, and the vibration may be reduced. Also, the lens base guide recess 212 having the radius of curvature may reduce a shock and/or vibration generated corresponding to arrival of the first lens group assembly at the home position from the alignment position, when compared with the lens base guide recess (not shown) of the linear type. For example, one of the moving velocity, the shock, and the vibration, or a combination of the moving velocity, the shock, and the vibration may be reduced.

The plurality of fixing protrusions 213 may be inserted into a second guide recess 233 that is formed on an outer circumferential surface of the cam barrel 230 to guide the rotation of the cam barrel 230. Also, the plurality of fixing protrusions 213 may be inserted into the second guide recess 233 of the cam barrel 230 to restrict the rotation of the cam barrel 230 and/or the movement of the cam barrel 230 in the optical axis direction.

The plurality of guide bars 214 extending in the optical axis direction may guide the front barrel 240 that is located in the cam barrel 230 to linearly move in the optical axis direction (for example, +z direction or −z direction) corresponding to the rotation of the cam barrel 230. A plurality of guide bar holes 242 into which the plurality of guide bars 214 are inserted may be formed in the front barrel 240. The plurality of guide bars 214 may restrict rotation of the front barrel 220 according to the rotation of the cam barrel 230. Also, since the front barrel 240 that is linearly moved by the plurality of guide bars 214 is applied to the photographing apparatus 100, a size of a lens barrel may be reduced.

The plate spring 215 may attenuate vibrations caused by the rotation of the cam barrel 230.

The first stopper 216 may restrict the movement of the first lens group assembly 220 that is guided by the lens base guide recess 212.

The locking protrusion 217 penetrates through the front barrel 240 to contact a locking lever 263 (see FIG. 6) of the AF assembly 260, according to the rotation of the cam barrel 230. The locking protrusion 217 may be a fixed locking protrusion formed on a bottom surface of the lens 210 or a fixed locking protrusion extending from an inner side surface of the lens base 210. Also, the locking protrusion 217 may include a movable locking protrusion (not shown) that may be moved by the driving force transferred from another component (for example, the motor). The locking protrusion 217 may be located within the inner diameter of the cam barrel 230 in consideration of contact with the cam barrel 230 and/or miniaturization of the lens driving assembly 200. The locking protrusion 217 is formed to protrude in the optical axis direction (+z direction).

The image sensor 296 may be aligned on the lens center axis of the first lens group assembly 220 and the second lens group barrel 250 through the image sensor opening 210a of the lens base 210. An area of the image sensor opening 210a may vary depending on a size of the image sensor 296 (for example, an axis width * axis height)

When the first lens group assembly 220 reaches the alignment position (for example, the second state), the plate spring 215 may attenuate shock and/or vibration generated due to arrival of the first lens group assembly 220 at the alignment position.

When the first lens group assembly 220 reaches the alignment position, the second stopper (not shown) may restrict the movement of a first lens group stopper 224 of the first lens group assembly 220.

The spring 219 provides the first lens group assembly 220 with an elastic force in a direction of rotation to the alignment position. The spring 219 may be a torsion coil spring, and in particular, may be a torsion coil spring having a hook at an end thereof or at opposite ends thereof.

The hook at an end of the spring 219 may be supported by the connection arm 223 of the first lens group assembly 220, and the hook at the other end of the spring 219 may be supported by the lens base 210. Also, the spring 219 may be a tensile coil spring having an end and the other end that are respectively supported by the lens base 210 and the connecting arm 223 of the first lens group assembly 220. The first lens group assembly 220 may be moved from the home position to the alignment position through the opening 232 of the cam barrel 230 by the elastic force of the spring 219.

The first lens group assembly 220 may include a first lens group barrel 221, a shaft insertion pillar 222, the connecting arm 223 connecting the first lens group barrel 221 and the shaft insertion pillar 222 to each other, the first lens group stopper 224, and a first lens group guide protrusion (not shown).

The first lens group barrel 221 may support one lens (not shown). Also, the first lens group barrel 221 may support two or more lenses (not shown) and a lens sheet (not shown) located between the two or more lenses. One of ordinary skill in the art would appreciate that the number of lenses supported by the first lens group barrel 221 and/or the number of lens sheets may be changed.

The shaft insertion pillar 222 may be formed as a cylinder or a cone having a through hole 222*a*, through which the shaft 211 is inserted. The spring 219 may surround an outer circumferential surface of the shaft insertion pillar 222.

The connecting arm 223 connects the first lens group barrel 221 and the shaft insertion pillar 222 to each other. The connecting arm 223 may support the first lens group barrel 221.

The first lens group stopper 224 may extend from the first lens group barrel 221 in a radial direction. If the first lens group assembly 220 is aligned in the optical axis, the first lens group stopper 224 restricts the first lens group assembly 220 that moves along the lens base guide recess 212. The first lens group stopper 224 may restrict the movement of the first lens group assembly 220 in a horizontal direction (for example, a direction crossing the optical axis).

The first lens group guide protrusion (not shown) located on a lower end of the first lens group assembly 220 may guide the first lens group assembly 220 that is moved by the elastic force to the alignment position along the lens base guide recess 212. The first lens group guide protrusion 225 may restrict the movement of the first lens group assembly 220 in the horizontal direction (for example, the direction crossing the optical axis) guided by the lens base guide recess 212.

The cam barrel 230 that may rotate includes a plurality of first guide recesses 231, the opening 232, a plurality of second guide recesses 233, and a gear 234.

The cam barrel 230 is mounted on the lens base 210, and is rotated about the optical axis by the driving force transferred through the motor 291 and the gear train (not shown). When comparing with a cam barrel that may rotate and linearly move, the number of the gear trains (not shown) and/or a height of the gear train (not shown) may be reduced due to the cam barrel 230 that only rotates, and thus, a size of the barrel may be reduced.

The plurality of first guide recesses 231 are formed in an inner circumferential surface of the cam barrel 230. The number of the first guide recesses 231 may be equal to or greater than the number of protrusions 241 of the front barrel 240. For example, if the number of the first guide recesses 231 is five, the number of the protrusions 241 of the front barrel 240 may be five or less. Each of the first guide recesses 231 may be formed at an upper end of the cam barrel 230 downwardly to extend in a circumferential direction, and then, extend downward to be slanted and extend in the circumferential direction again. For example, each of the first guide recesses 231 may be formed as a shape ( ⌐ ). The protrusion 241 of the front barrel 240 may be inserted into an upper end of each first guide recess 231. Each first guide recess 231 may be formed to correspond to a height of the protrusion 241 of the front barrel 240, or a contact area between the protrusion 241 and the first guide recess 231.

The opening 232 is a portion through which the first lens group barrel 221, which is moved to the home position and the alignment location by the elastic force, passes. The opening 232 is formed at a lower end of the cam barrel 230. A height of the opening 232 according to the present embodiment is 4.86 mm from the lower end of the cam barrel 230. This height of 4.86 mm of the opening 232 may be appropriate, provided that the first lens group assembly 220 may pass through the opening 232. An opening angle of the opening 232 based on the optical axis is 120°, for example, 80° to 150°. Also, the plurality of first guide recesses 231 may include a short first guide recess 231*b* having a relatively shorter length due to the opening 232 and a long first guide recess 231*a* having a relatively longer length due to not overlapping with the opening 232.

The plurality of second guide recesses 233 are formed in the outer circumferential surface of the cam barrel 230. The number of the second guide recesses 233 may be equal to or greater than that of the fixing protrusions 213 of the lens base 210. For example, if the number of the second guide recesses 233 is four, the number of the fixing protrusions 213 may be four or less. Each of the second guide recesses 233 may be formed upward at the lower end of the cam barrel 230, and then, may extend in the circumferential direction so that each of the fixing protrusions 213 of the lens base 210 may be inserted therein. For example, each second guide recess 233 may be formed to have a shape ( ⌐ ). A thickness of each second guide recess 233 may correspond to the height of the fixing protrusion 213 of the lens base or an area of a contact surface between the fixing protrusion 213 and the second guide recess 233.

The second guide recess 233 may have guide recesses having different heights and formed upward at the lower end of the cam barrel 230 to correspond to heights of the fixing protrusions 213, respectively. For example, a height of a second guide recess 233 that is adjacent to the opening 232 may be greater than those of the other second guide recesses 233.

The gear 234 is formed on a partial outer circumferential surface of the cam barrel 230. Also, the gear 234 may be formed on the outer circumferential surface of the cam barrel 230, where the opening 232 is not located. The gear 234 formed on a partial area of the outer circumferential surface may correspond to a rotating angle of the cam barrel 230. For example, if the rotating angle of the cam barrel 230 is 50°, the gear 234 may be formed on the outer circumferential surface of the cam barrel 230 so that an angle between a start point and a final point of the gear 234 based on the optical axis may exceed 50°.

The cam barrel 230 rotates by using the driving force transmitted to the gear 234 via the motor 291 and the gear train. If the cam barrel 230 rotates, the first lens group assembly 220 receiving the elastic force may be moved from the home position to the alignment position via the opening 232 due to the elastic force of the spring 219. If the cam barrel 230 rotates, the front barrel 240 accommodated in the cam barrel 230 may linearly move in the optical axis direction.

The front barrel 240 may include a plurality of protrusions 241, a plurality of guide bar holes 242, and a locking protrusion opening 243.

The plurality of protrusions 241 are guided by the first guide recesses 231 of the cam barrel 230 that is rotating. The front barrel 240 linearly moves in the optical axis direction (+z direction or −z direction) due to the rotation of the cam barrel 230 and the guide bars 214. If the first lens group assembly 220 is at the home position, the front barrel 240 located inside of the cam barrel 230 may be accommodated in a first location of the front barrel 240 that is adjacent to the image sensor 296. If the first lens group assembly 220 is moved from the home position to the alignment position by the rotation of the cam barrel 230 and the elastic force, the front barrel 240 located in the cam barrel 230 may be moved (for example, linearly moved) to a second location that is apart from the image sensor 296 in the optical axis direction (+z direction).

A distance between the first location and the second location of the front barrel 240 (for example, a linearly moved distance) may be greater than the height of the first lens group assembly 220. For example, if the height of the first lens group assembly 220 is 4 mm, the distance between the first location and the second location of the front barrel 240 may exceed 4 mm in consideration of a thickness of the first lens group assembly 220. A moving distance of the protrusions 241 guided by the first guide recesses 231 may be greater than the distance between the first location and the second location of the front barrel 240. For example, if the height of the first lens group assembly 220 is 4 mm, the moving distance of the protrusions 241 of the front barrel 240 may exceed 4.1 mm. The moving distance of the protrusions 241 of the front barrel 240 may vary depending on the inner diameter of the cam barrel 230, as well as the height of the first lens group assembly 220.

The guide bars 214 of the lens base 210 may penetrate through the plurality of guide bar holes 242. The number of the guide bar holes 242 may vary depending on the number of guide bars 214 disposed on the lens base 210. The rotation of the front barrel 240 according to the rotation of the cam barrel 230 may be restricted by the plurality of guide bar holes 242 and the plurality of guide bars 214.

The locking protrusion opening 243 is a through hole of the locking protrusion 217 protruding from the lens base 210. The locking protrusion 217 may contact the locking lever (263, see FIG. 6) after passing through the locking protrusion opening 243. Also, the front barrel 240 accommodates the second lens group barrel 250.

The second lens group barrel 250 includes a plurality of lenses 251, a plurality of lens sheets (not shown), and a second lens group barrel protrusion 252.

The second lens group barrel 250 may support the plurality of lenses 251 and the plurality of lens sheets. For example, the second lens group barrel 250 may support four lenses and two lens sheets. The second lens group barrel 250 may be accommodated in the front barrel 240 located thereunder. One of ordinary skill in the art would appreciate that the number of lenses and/or the number of lens sheets supported by the second lens group barrel 250 may be changed.

One or more second lens group barrel protrusions 252 are formed on an outer circumferential surface of the second lens group barrel 250.

The shutter module 255 may adjust a passage time of light that is input to the image sensor 296. Also, an aperture may adjust a light intensity.

The AF assembly 260 may provide an AF function, in which a distance between the plurality of lens 251 in the second lens group 250 and the image sensor 296 is adjusted by using a driving property of a voice coil motor (VCM). The VCM may have a spring, a coil, and a magnet, and may adjust the lenses 251 in the second lens group barrel 250 in the optical axis direction.

The shutter module 255, the second lens group barrel 250, and the AF assembly 260 are accommodated in the front barrel 240. The shutter module 255, the second lens group barrel 250, the AF assembly 260, and the front barrel 240 may be coupled to each other. The AF assembly 260 receiving the second lens group barrel 250 is located at an intermediate portion, and the shutter module 255 and the front barrel 240 may be coupled by using various coupling members (for example, a screw, a rivet, a hook, etc.), an adhesive tape, or an adhesive.

The panel barrel 270 may include a panel barrel ring 271, glass (for example, transparent or semi-transparent glass, not shown), a glass sheet (not shown), and an infrared ray (IR) filter.

The panel barrel ring 271 may support the glass (transparent or semi-transparent, not shown), the glass sheet (not shown), and the IR filter (not shown) by being coupled thereto from a front side of the panel barrel 270. The panel barrel 270 may be coupled to the shutter module 255 by using various coupling members (for example, a screw, a rivet, a hook, etc.), the adhesive tape, or the adhesive.

The front cap 280 may include a front cap ring 281 and a front cap shield (not shown). The front cap ring 281 is coupled to the front cap shield and the front cap 280. The front cap 280 may be coupled to the lens base 210. The front cap 280 and the lens base 210 may be coupled to each other by using various coupling members (for example, a screw, a rivet, a hook, etc.), the adhesive tape, or the adhesive.

The driving module 290 may include the motor 291 and a gear train (not shown) consisting of a plurality of gears.

A driving force of the motor 291 that is activated by the control of the control unit 110 is transmitted to the gear 234 of the cam barrel 230 via the gear trains (not shown). The rotating direction of the cam barrel 230 (for example, a clockwise direction or a counter-clockwise direction) may be determined to correspond to a rotating direction of the motor 291 that is determined by the control of the control unit 110. Also, the linear movement direction of the front barrel 240 (for example, +z direction or −z direction) is determined to correspond to the rotating direction of the motor 291 that is determined by the control of the control unit 110. A rotating speed of the motor 291 may be constant or non-constant. One of ordinary skill in the art would appreciate that the rotating speed of the motor 291 may be constant or non-constant.

The driving module 290 may be coupled to the lens base 210 by using various coupling members (for example, a screw, a rivet, a hook, etc.), the adhesive tape, or the adhesive.

The image sensor module 295 may include the image sensor 296 and a substrate (printed circuit board (PCB)) 297.

The image sensor 296 may include a semiconductor device that converts input light into an electric signal. A size of the image sensor 296 may be, for example, 1/2.3" to 4/3" in a diagonal length thereof. Also, the image sensor 296 may be a charge-coupled device (CCD) image sensor. In addition, the image sensor 296 may include a complementary metal-oxide semiconductor (CMOS) image sensor.

The substrate (PCB) 297 may connect the image sensor 296 and a semiconductor device that is necessary to drive the image sensor 296 to each other. Also, the control unit 110 and the image sensor 296 may be connected to each other via the substrate 297, and the control unit 110 may control the image sensor 296. The image sensor module 295 may be coupled to the lens base 210 by using various coupling members (for example, a screw, a rivet, a hook, etc.), the adhesive tape, or the adhesive.

The lens driving assembly 200 may be located closer to one of opposite sides of the photographing apparatus 100 than to a center of the photographing apparatus 100. Also, the lens driving assembly 200 may be located at a center portion between a center point of the photographing apparatus 100 and one of the opposite side surfaces of the photographing apparatus 100.

The photographing apparatus 100 according to the present embodiment may perform an optical function (for example, a photographing operation) at one stage; however, the photographing apparatus 100 may perform a zooming operation through two to five stages by using an additional lens group barrel (not shown) moving in the optical axis direction (+z direction or −z direction). Also, the lens driving assembly 200 may be realized in a lens exchangeable manner, that is, may be attached to/detached from the photographing apparatus 100.

FIG. 5 is a schematic perspective view of the front barrel 240 and the cam barrel 230 in the lens driving assembly 200 of the photographing apparatus 100 according to an embodiment of the present invention.

Referring to FIG. 5, the front barrel 240 located in the cam barrel 230 is separated and schematically shown.

The cam barrel 230 may include the plurality of first guide recesses 231, the opening 232, the plurality of second guide recesses 233, the gear 234, a first protrusion 235a, and a second protrusion 235b. The front barrel 240 includes the plurality of protrusions 241 and the plurality of guide bar holes 242.

Each of the first guide recesses 231 of the cam barrel 230 includes a lower region 231m, an upper region 231n, and a connecting region 231l connecting the upper and lower regions 231n and 231m to each other.

If the photographing apparatus 100 is in the first state, the protrusion 241 of the front barrel 240 is located at the lower region 231m of each first guide recess 231 of the cam barrel 230. If the photographing apparatus 100 is in the first state, the locking protrusion 217 of the lens base 210 may penetrate through the locking protrusion opening 243 of the front barrel 240 to contact the AF assembly 260.

If the photographing apparatus 100 is changed from the first state to the second state, the protrusion 241 of the front barrel 240 may be moved from the lower region 231m of the first guide recess 231 to the connecting region 231l.

If the photographing apparatus 100 is in the second state, the protrusion 241 of the front barrel 240 may be located at the upper region 231n after moving from the connecting region 231l of the first guide recess 231. Due to the opening 232 that is formed on the lower end of the cam barrel 230, some of the first guide recesses 231 may not have an entire lower region 231m, a part of the lower region 231m, or a part of the connecting region 231l. For example, the first guide recess 231b may have the upper region 231n and a part of the connecting region 231l. The first guide recess 231b may only have the upper region 231n and the connecting region 231l. Otherwise, the first guide recess 231b may have the upper region 231n, the connecting region 231l, and a part of the lower region 231m. If the photographing apparatus 100 is in the second state, the locking protrusion 217 of the lens base 210 may be separated from the locking protrusion opening 243 of the front barrel 240 so as not to contact the AF assembly 260.

The second guide recess 233 may be formed to have an arc length that is greater than an arc length corresponding to the rotating angle of the cam barrel 230 (for example, an arc length from a rotation start point of the cam barrel 230 to a rotation end point of the cam barrel 230). The second guide recess 233 guides the fixing protrusion 213 of the lens base 210 in correspondence with the rotation of the cam barrel 230.

The first protrusion 234a and the second protrusion 235a may electively contact a side surface of the connecting arm 223 of the first lens group assembly 220, to which the elastic force is transmitted, in correspondence with the rotation of the cam barrel 230. For example, the first protrusion 235a and the second protrusion 235b may contact the side surface of the connecting arm 223 of the first lens group assembly 220. Only one of the first protrusion 235a and the second protrusion 235b may contact the side surface of the connecting arm 223 of the first lens group assembly 220. Otherwise, neither the first protrusion 235a nor the second protrusion 235b may contact the side surface of the connecting arm 223 of the first lens group assembly 220.

Owing to the selective contact between the first and second protrusions 235a and 235b and the side surface of the connecting arm 223 of the first lens group assembly 220, at least one selected from a moving velocity, a shock, and a vibration corresponding to the movement from the home position to the alignment position of the first lens group assembly 220 may be reduced. For example, one of the moving velocity, the shock, and the vibration, or a combination of the moving velocity, the shock, and the vibration may be reduced. Also, at least one selected from a moving velocity, a shock, and a vibration corresponding to the movement from the alignment position to the home position of the first lens group assembly 220 may be reduced. For example, one of the moving velocity, the shock, and the vibration, or a combination of the moving velocity, the shock, and the vibration may be reduced.

FIG. 6 is an exploded perspective view of components separated from the AF assembly 260 in the photographing apparatus 100 according to an embodiment of the present invention.

Referring to FIG. 6, the AF assembly 260 includes an AF base 261, a second lens group barrel holder 262, the locking lever 263, a locking lever spring 264, and a ball guide 265. The AS assembly 260 may receive the second lens group barrel 250. The AF base 261 and the ball guide 265 may be defined as an AF frame 266.

The AF base 261 includes one or more through holes 261a for inserting the locking lever 263 and an AF opening 261b. The through holes 261a may be formed on edges where side surfaces of the AF base 261 meet each other. A locking lever shaft 263a may be inserted into the through holes 261a.

The optical axis passes through the AF opening 261b. A diameter of the AF opening 261b may be equal to or greater than a diameter of the second lens group barrel 250.

The second lens group barrel holder 262 includes a front surface 262a, a semicircular protrusion 262b formed on an outer circumferential surface of the second lens group barrel holder 262, and a boss 262d located on the front surface 262a.

The front surface 262a of the second lens group barrel holder 262 may contact the second lens group barrel protrusion 252. The second lens group barrel 250 has the second lens group barrel protrusion 252 on the outer circumferential surface thereof. The second lens group barrel holder 262 may support the second lens group barrel 250 by the front surface 262a thereof contacting the second lens group barrel protrusion 252. The second lens group barrel holder 262 may receive the second lens group barrel 250 by the front surface 262a thereof contacting the second lens group barrel protrusion 252.

The AF assembly 260 according to another embodiment of the present invention may include the second lens group barrel 250 and the second lens group barrel holder 262 that are integrally formed with each other. The second lens group barrel 250 and the second lens group barrel holder 262 that are integrally formed with each other may be referred to as a lens holder unit (not shown). The lens holder unit (not shown) may include the front surface 262a, the semi-circular protrusion 262b, the boss 262d, and a lens frame (not shown). The lens frame (not shown) may be formed on the lens holder unit (not shown) by processing a main body of the lens holder unit (not shown). The lens frame (not shown) of the lens holder unit (not shown) may support the lens by accommodating the lens therein, like the second lens group barrel 250. A cross-section of the lens frame (not shown) is substantially the same as that of the second lens group barrel 250 shown in FIG. 7B.

A distance between the front surface of the lens holder unit (not shown) and an inner side surface 265c of the ball guide 265 may be gradually reduced by the locking lever 263 and the elastic force. Also, the front surface of the lens holder unit (not shown) and the inner side surface 265c of the ball guide 265 may contact each other via the locking lever 263 and the elastic unit.

Also, the lens holder unit (not shown) may include a magnet 262c. The lens holder unit (not shown) is substantially the same as the second lens group barrel holder 262, and thus, a repeated description thereof will not be provided.

The semi-circular protrusions 262b may include one or more first semi-circular protrusions 262b1. In addition, the semi-circular protrusions 262b may include one or more second semi-circular protrusions 262b2. The semi-circular protrusions 262b may be formed on a lower end of the second lens group barrel holder 262. Also, some of the semi-circular protrusion 262b may be formed on an intermediate portion and/or the lower end of the second lens group barrel holder 262. A height h2 of the one or more second semi-circular protrusions 262b2 may be greater than a height h1 of the one or more first semi-circular protrusions 262b1. A radius of each of the second semicircular protrusions 262b2 may be equal to or greater than that of each of the first semi-circular protrusions 262b1.

The boss 262d may contact an inner side surface 265c (see FIG. 7B) of the ball guide 265. A height of the boss 262d may be about 50 mm. For example, the height of the boss 265d may be 20 mm to about 150 mm. A plurality of bosses 262d may be formed on the front surface 262a of the second lens group barrel holder 262.

Also, the second lens group barrel holder 262 may include a magnet 262c (see FIG. 7B).

The locking lever 263 may include a locking lever shaft 263a, a locking lever protrusion 263b, and a locking plate 263c.

The locking lever shaft 263a may be inserted into the through holes 261a of the AF base 261 to be moved in the optical axis direction (for example, +z direction or −z direction). If the locking lever protrusion 263b contacts the locking protrusion 217 of the lens base 210, the locking lever shaft 263a may be moved in the optical axis direction (for example, +z direction).

The locking lever protrusion 263b may be formed to protrude in a radial direction of the locking lever shaft 263a. In the photographing apparatus 100 of the first state, the locking lever protrusion 263b may contact the locking protrusion 217 of the lens base 210. In the photographing apparatus 100 of the second state, the locking lever protrusion 263b may be separated from the locking protrusion 217 of the lens base 210. If the photographing apparatus 100 is changed from the first state to the second state, the locking lever protrusion 263b starts to separate from the locking protrusion 217 of the lens base 210. Also, before the photographing apparatus 100 reaches the second state, the locking lever protrusion 263b may be completely separated from the locking protrusion 217 of the lens base 210.

The locking plate 263c extends from the locking lever shaft 263a in two branches in the circumferential direction of the second lens group barrel holder 262. The locking plate 263c supports the second lens group barrel holder 262 in the optical axis direction by using the two branches extending in the circumferential direction. The locking plate 263c may partially contact the semi-circular protrusions 262b of the second lens group barrel holder 262. The locking plate 263c may be closer to the optical axis than the locking lever protrusion 263b is.

An angle between opposite ends of the locking plate 263c that is divided into two branches based on the locking protrusion shaft 263a may be 120°. For example, the angle of the locking plate 263c is not limited so long as the locking plate 263c may extend so as to support the second lens group barrel holder 262. For example, the angle between the opposite ends of the locking plate 263c may range from 80° to 180°. A part of at least one of the two branches of the locking plate 263c extending in the circumferential direction may overlap with a hollow portion in the inner diameter of the second lens group barrel holder 262.

A locking lever spring (for example, a locking lever elastic member 264) provides the locking lever 263 with the elastic force. If the locking protrusion 217 and the locking lever 263 are separated from each other, the locking lever spring 264 may provide the locking lever 263 with the elastic force to make the locking lever 263 return to an original position. The locking lever spring 264 may be located between the through hole 261a and the locking lever protrusion 263b. The locking lever spring 264 may be a torsion coil spring. Otherwise, the locking lever spring 264 may be a compressive coil spring.

The locking lever 263 and the locking lever spring 264 are referred to as an AF locking unit. The AF locking unit supports the second lens group barrel holder 262 that accommodates the lens in the optical axis direction by using the locking protrusion 217 of the lens base 210 and the locking lever spring 264. Also, the AF locking unit may include the locking protrusion 217 of the lens base 210 and/or a moving protrusion 267b.

The ball guide 265 and the AF base 261 may be fitted with each other. The ball guide 265 may contact the front surface 262a of the second lens group barrel holder 262 accommodated in the AF base 261 and/or a side surface of the AF base 261. The ball guide 265 may include a coil 265a and a yoke 265b (see FIG. 7B). The lenses 251 may be moved to an optimal location on the optical axis direction (+z direction or −z direction) by a magnetic flux of the magnet 262c and an electric current flowing on the coil 265a. The lenses 251 may be moved to the optimal location for the AF operation by the magnet 262c of the AF assembly 260 and/or the coil.

The AF assembly 260 according to another embodiment of the present invention may include the AF base 261 and the ball guide 265 that are integrally formed with each other. That is, an AF frame 266 may denote a shape, in which the AF base 261 and the ball guide 265 are coupled to each other as separate members, and an integrally formed shape of the AF base 261 and the ball guide 265.

A distance between the front surface of the second lens group barrel 250 (or the boss 262d) and an inner side surface of the AF frame 266 (not shown, corresponding to reference numeral 265c of FIG. 7B) is gradually reduced by the locking lever 263 and the elastic force, according to another embodiment of the present invention. Also, the front surface of the second lens group barrel 250 (or the boss 262d) and the inner side surface of the AF frame 266 (not shown, corresponding to the reference numeral 265c of FIG. 7B) may contact each other by the locking lever 263 and the elastic force.

According to another embodiment, a distance between the front surface of the lens holder unit (not shown) and the inner side surface of the AF frame 266 (not shown, corresponding to 265c of FIG. 7B) may be gradually reduced by the locking lever 263 and the elastic force. Also, the front surface of the lens holder unit (not shown) and the inner side surface of the AF frame 266 (not shown, corresponding to 265c of FIG. 7B) may contact each other due to the locking lever 263 and the elastic force.

FIGS. 7A and 7B are schematic perspective view and cross-sectional view of the AF assembly in a case where the locking protrusion and the locking lever protrusion are separated from each other in the photographing apparatus 100 according to an embodiment of the present invention.

Referring to FIGS. 7A and 7B, the first lens group assembly 220 of the photographing apparatus 100 is in the alignment position by the rotation of the cam barrel 230 (for example, 47° angle) and the elastic force. The first lens group assembly 220, the second lens group barrel 250, and the image sensor 296 are aligned on the optical axis. The front barrel 240 that accommodates the second lens group barrel 250 and moves linearly in the optical axis direction is at the second location. Corresponding to the movement of the front barrel 240 to the second location, the AF assembly 260 may be apart from the image sensor 296 and may protrude. A location of the AF assembly 260 when the front barrel 240 reaches the second location is referred to as 'protruding location'.

The second lens group barrel holder 262 supports the second lens group barrel 250 by using the contact between the front surface 262a thereof and the protrusion 252 of the second lens group barrel 250. The locking lever 263 supports the second lens group barrel holder 262 by using the contact between the locking plate 263c and the semi-circular protrusions 262b of the second lens group barrel holder 262.

The locking protrusion 217 and the locking lever protrusion 263b are separated by a distance l1 (=5.1 mm). For example, the distance l1 may range from about 3 mm to about 7 mm. One of ordinary skill in the art would appreciate that the distance between the locking protrusion 217 and the locking lever protrusion 263b may vary depending on the protruding height of the locking protrusion 217. Also, the distance l1 may be determined to correspond to a height h of the first lens group assembly 220. For example, when the height h of the first lens group assembly 220 increases, the distance l1 may be increased. Also, the height h of the first lens group assembly 220 is lowered, the distance l1 may be reduced.

The boss 262d formed on the front surface 262a of the second lens group barrel holder 262 and the inner side surface 265c of the ball guide 265 may be separated from each other by a distance (for example, a stroke, l2=850 mm). For example, the distance l2 may range from about 700 mm to about 950 mm. Thus, the second lens group barrel holder 262 may have a sufficient stroke, and the AF function may be performed.

If the first lens group assembly 220 of the photographing apparatus 100 is in the alignment position, the distance l1 between the locking protrusion 217 and the locking lever protrusion 263b is greater than the distance l2 between the front surface 262a of the second lens group holder 262 and the inner side surface 265c of the ball guide 265.

If the locking protrusion 217 and the locking lever protrusion 263b are separated from each other, the locking lever spring 264 located at the locking lever shaft 263a is not in a deformation state (for example, a compressive deformation length (k)=0) because there is no external force applied thereto. One of opposite ends of the coil of the locking lever spring 264 may contact the locking lever protrusion 263b.

FIGS. 8A and 8B are schematic perspective view and cross-sectional view of the AF assembly 260 in a case where the locking protrusion 217 and the locking lever protrusion 263b contact each other in the photographing apparatus 100 according to an embodiment of the present invention.

Referring to FIGS. 8A and 8B, the first lens group assembly 220 of the photographing apparatus 100 is in the home position. The first lens group assembly 220 may be moved from the alignment position to the home position by the rotation of the cam barrel 230 (for example, rotation from an angle 47° to 10°) and the protrusions of the cam barrel 230 (235a and/or 235b). Before the locking protrusion 217 and the locking lever protrusion 263b contact each other, the first lens group assembly 220 may reach the home position. A location of the AF assembly 260 (or a location of the second lens group barrel holder 262) when the locking protrusion 217 and the locking lever protrusion 263b initially contact each other may be referred to as 'contact location'.

The AF assembly 260 accommodated in the front barrel 240 is moved in the optical axis direction (−z direction) by the rotation of the cam barrel 230. The locking protrusion 217 may penetrate through the locking protrusion opening 243 of the front barrel 240 that descends by about the distance l1 to contact the locking lever protrusion 263b. The locking protrusion 217 may be connected to the locking lever protrusion 263b of the locking lever 263, the locking plate 263c of the locking lever 263, and the semi-circular protrusion 262b of the second lens group barrel holder 262 due to the descending of the front barrel 240.

If the locking protrusion 217 and the locking lever protrusion 263b contact each other, the locking lever spring 264 located at the locking lever shaft 263a is not in the deformation state (for example, the compressive deformation length (k)=0) because there is no external force applied thereto, similarly to FIG. 7A and 7B. If the locking protrusion 217 and the locking lever protrusion 263b contact each other, the deformation of the locking lever spring 264 (for example, compression) may start.

FIGS. 9A and 9B are schematic perspective view and cross-sectional view of the AF assembly 260 in a case where the locking protrusion compresses the locking lever protrusion in the photographing apparatus 100 according to an embodiment of the present invention.

Referring to FIGS. 9A and 9B, the front barrel 240 may be moved to the first location that is adjacent to the image sensor 296 in the optical axis direction (−z direction) due to the rotation of the cam barrel 230 (for example, rotation from an angle 10° to 0°). The AF assembly 260 may be accommodated, in correspondence to the movement of the front barrel 240 to the first location. A location of the AF assembly 260 (or a location of the second lens group barrel holder 262) when the front barrel 240 reaches the first location is referred to as 'accommodation location'.

In a case where the cam barrel 230 continuously rotates and the front barrel 240 continuously descends, the locking protrusion 217 may contact the locking lever protrusion 263b to support the second lens group barrel holder 262 in the optical axis direction. Due to the contact between the locking protrusion 217 and the locking lever protrusion 263b, the locking plate 263c of the locking lever 263 may support the semi-circular protrusion 262b of the second lens group barrel holder 262. If the locking lever 217 and the locking lever protrusion 263b contact each other and the front barrel 240 continuously descends, the locking lever spring 264 is gradually compressed (for example, deformation). Since the locking lever spring 264 is gradually compressed, the distance between the coils of the locking lever spring 264 may be gradually reduced until the coils are adhered to each other.

As the cam barrel 230 rotates continuously, the second lens group barrel holder 262 may be moved in the optical axis direction as much as a length obtained by subtracting the spring length of FIG. 9B (for example, compressed spring length) from the spring length of FIG. 7B (for example, spring length before compression). The locking lever spring 264 may be elastically transformed (for example, compression) from a state before the transformation (for example, the compressive transformation length (k)=0) to the transformed state (for example, the compressive transformation length (k)=800±50 μm) due to the external force applied thereto.

In a case where the cam barrel 230 continuously rotates and the second lens group barrel holder 262 is supported, the distance (l2) between the boss 262d of the second lens group barrel 250 and the inner side surface 265c of the ball guide 265 may be gradually reduced. When the rotation of the cam barrel 230 is finished (for example,) 0°, the boss 262d of the second lens group barrel 250 may contact the inner side surface 265c of the ball guide 265. When the rotation of the cam barrel 230 is finished (for example, 0°), the boss 262d of the second lens group barrel 250 may be separated from the inner side surface 265c of the ball guide 265. Also, when the rotation of the cam barrel 230 is finished (for example, 0°), the distance (l2) between the boss 262d of the second lens group barrel 250 and the inner side surface 265c of the ball guide 265 may be substantially 0 mm (for example, 150 μm or less).

When the boss 262d of the second lens group barrel 250 contacts the inner side surface 265c of the ball guide 265, the boss 262d may operate as a stopper of the second lens group barrel 250. It may be difficult for the second lens group barrel holder 262 to ensure a sufficient stroke.

When the rotation of the cam barrel 230 is finished (for example, 0°) and the boss 262d of the second lens group barrel 250 contacts the inner side surface 265c of the ball guide 265, breaking of the lens 251 that is supported by the fixed second lens group barrel 250 due to the shock transferred from outside of the photographing apparatus 100 may be prevented, and noise generated due to the shock may be prevented. If the rotation of the cam barrel 230 is finished (for example, 0°) and the boss 262d of the second lens group barrel 250 contacts the inner side surface 265c of the ball guide 265, the vibration of the lens 251 that is supported by the fixed second lens group barrel 250 caused by the external force may be prevented.

FIGS. 10A and 10B are schematic perspective view and cross-sectional view of the AF assembly 260 when the moving protrusion and the locking lever protrusion contact each other due to an additional driving source in the photographing apparatus 100 according to another embodiment of the present invention.

Referring to FIGS. 10A and 10B, the AF assembly 260 is similar to that of FIGS. 8A and 8B, and includes an additional lock driving module 267. The lock driving module 267 includes a locking motor 267a, a moving protrusion 267b, and a screw 267c. The locking motor 267a may include a variety kinds of direct current (DC) motors, a step motor, and/or a VCM actuator. The DC motor and the step motor may transfer a driving force to the screw 267c. Also, the VCM actuator may transfer the driving force to the moving protrusion (not shown) that linearly moves. For example, the moving protrusion (not shown) may be linearly moved in the optical axis direction (+z direction or −z direction) along a VCM guide bar (not shown) by the magnet (not shown) and a coil (not shown) located on the moving protrusion (not shown).

The moving protrusion 267b may be moved in the optical axis direction (+z direction or −z direction) by the screw 267c that changes the driving force of the locking motor 267a into the linear movement or the VCM guide bar (not shown) according to the control of the control unit 110. If the locking motor 267a is the DC motor and the step motor, the locking motor 267a transmits the driving force to the screw 267c. Also, if the locking motor 267a is the VCM actuator, the VCM actuator (not shown) may transmits the driving force to the moving protrusion 267b having the magnet (not shown). The moving protrusion 267b may elevate in the optical axis direction. The moving protrusion 267b may be referred to as a movable locking protrusion.

The AF assembly 260 accommodated in the front barrel 240 may be moved in the optical axis direction (−z direction) by the linear movement of the moving protrusion 267b corresponding to the driving force of the locking motor 267a according to the control of the control unit 110. The moving protrusion 267b may contact the locking lever protrusion 263b. The moving protrusion 267b may be connected to the locking lever protrusion 263b of the locking lever 263, the locking plate 263c of the locking lever 263, and the semi-circular protrusion 262b of the second lens group barrel holder 262 by the driving force of the locking motor 267a.

Components shown in FIGS. 10A and 10B are substantially the same as those of FIGS. 7A through 8B, and thus, detailed descriptions thereof are omitted.

FIGS. 11A and 11B are schematic perspective view and cross-sectional view of the AF assembly 260 when the moving protrusion compresses the locking lever protrusion in the photographing apparatus 100 according to another embodiment of the present invention.

Referring to FIGS. 11A and 11B, when the locking motor 267a continuously transmits the driving force, the moving protrusion 267b may contact the locking lever protrusion 263b to move the second lens group barrel holder 262 in the optical axis direction (+z direction). Due to the contact between the moving protrusion 267*b* and the locking lever protrusion 263*b*, the locking plate 263*c* of the locking lever 263 may support the semi-circular protrusion 262*b* of the second lens group barrel holder 262. When the locking motor 267*a* continuously transmits the driving force, the locking lever spring 264 is gradually compressed. Since the locking lever spring 264 is gradually compressed, the distance between the coils of the locking lever spring 264 may be gradually reduced until they are adhered to each other.

When the driving force transmission of the locking motor 267*a* is finished and the boss 262*d* of the second lens group barrel 250 contacts the inner side surface 265*c* of the ball guide 265, damage of the lens 251 supported by the fixed second lens group barrel 250 due to the shock applied from the outside may be prevented, and noise generated due to the shock may be prevented. If the rotation of the locking motor 267*a* is finished and the boss 262*d* of the second lens group barrel 250 contacts the inner side surface 265*c* of the ball guide 250, shaking of the lens 251 supported by the fixed second lens group barrel 250 due to the external force may be prevented.

Components shown in FIGS. 11A and 11B are substantially the same as those of FIGS. 9A and 9B, and thus, detailed descriptions thereof are omitted.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. An auto focus (AF) locking unit comprising:
 a locking protrusion;
 a locking lever provided in an AF frame accommodating a lens group barrel holder including lenses to be moved in an optical axis direction, the locking lever configured to:
  move along the optical axis direction, and
  support the lens group barrel holder by contacting the locking protrusion when the AF frame is moved to an accommodation location that is adjacent to an image sensor; and
 a locking lever elastic member providing an elastic force in the optical axis direction to the locking lever in correspondence to the contact between the locking protrusion and the locking lever,
 wherein, when the AF frame is moved toward the accommodation location, a distance between a front surface of the lens group barrel holder and an inner side surface of the AF frame, which faces the front surface of the lens group barrel holder, is reduced.

2. The AF locking unit of claim 1, wherein the front surface of the lens group barrel holder and the inner side surface of the AF frame contact each other at the accommodation location.

3. The AF locking unit of claim 1,
 wherein a boss is provided on the front surface of the lens group barrel holder to contact the inner side surface of the AF frame that is at the accommodation location, and
 wherein a protrusion that is supported by the locking lever is provided on an outer circumferential surface of the lens group barrel holder.

4. The AF locking unit of claim 1, wherein, when the lens group barrel holder reaches the accommodation location, the locking lever elastic member provides the locking lever with maximum elastic force.

5. The AF locking unit of claim 4,
 wherein the AF frame has a protruding location that is separated farther from the image sensor than the accommodation location is, and
 wherein the locking protrusion and the locking lever are separated from each other at the protruding location.

6. The AF locking unit of claim 5,
 wherein the AF frame has a contact location where the locking protrusion and the locking lever contact each other when the AF frame is moved to the accommodation location, and
 wherein the locking protrusion and the locking lever are separated from each other between the protruding location and the contact location.

7. The AF locking unit of claim 6, wherein the locking lever elastic member is elastically transformed while the AF frame is moved between the contact location and the accommodation location.

8. The AF locking unit of claim 1, wherein the locking lever comprises:
 a locking lever shaft supported by the AF frame to be moved in the optical axis direction,
 a locking lever protrusion extending from the locking lever shaft and contacting the locking protrusion, and
 a locking plate extending from the locking lever shaft in two branches in a circumferential direction of the lens group barrel holder to support the lens group barrel holder.

9. The AF locking unit of claim 8, wherein an angle between the two branches of the locking plate divided from the locking lever shaft is 180° or less.

10. The AF locking unit of claim 1,
 wherein the AF frame has a protruding location that is separated farther from the image sensor than the accommodation location is, and
 wherein a distance between the locking lever and the locking protrusion is greater than a distance between the front surface of the lens group barrel holder and the inner side surface of the AF frame at the protruding location.

11. An auto focus (AF) locking unit comprising:
 a movable locking protrusion;
 a locking motor for moving the movable locking protrusion in an optical axis direction;
 a locking lever provided in an AF frame accommodating a lens group barrel holder including lenses to be moved in the optical axis direction, the locking lever configured to:
  move along the optical axis direction, and
  support the lens group barrel holder by contacting the movable locking protrusion; and
 a locking lever elastic member providing the locking lever with an elastic force in the optical axis direction in correspondence to the contact between the movable locking protrusion and the locking lever.

12. The AF locking unit of claim 11,
 wherein the AF frame is moved between an accommodation location that is adjacent to an image sensor and a protruding location separated farther from the image sensor than the accommodation location is, and wherein, when the AF frame is moved to the accommodation location, the locking lever contacts the movable locking protrusion, and a distance between a front surface of the lens group barrel holder and an inner side surface of the AF frame, which faces the front surface of the lens group barrel holder, is reduced.

13. The AF locking unit of claim 11,
wherein the AF frame is moved between an accommodation location that is adjacent to an image sensor, and a protruding location separated farther from the image sensor than the accommodation location is, and
wherein, when the AF frame is at the accommodation location, the locking motor moves the movable locking protrusion to push the locking lever and the distance between a front surface of the lens group barrel holder and an inner side surface of the AF frame, which faces the front surface of the lens group barrel holder, is reduced.

14. A photographing apparatus comprising:
an image sensor;
an auto focus (AF) assembly in which a lens group barrel holder including lenses is accommodated; and
an AF locking unit comprising:
  a locking protrusion,
  a locking lever provided in an AF frame accommodating the lens group barrel holder including the lenses to be moved in an optical axis direction, the locking lever configured to:
    move along the optical axis direction, and
    support the lens group barrel holder by contacting the locking protrusion when the AF frame is moved to an accommodation location that is adjacent to the image sensor, and
  a locking lever elastic member providing an elastic force in the optical axis direction to the locking lever in correspondence to the contact between the locking protrusion and the locking lever,
wherein, when the AF frame is moved toward the accommodation location, a distance between a front surface of the lens group barrel holder and an inner side surface of the AF frame, which faces the front surface of the lens group barrel holder, is reduced.

15. The photographing apparatus of claim 14, further comprising a lens driving assembly comprising a motor and moving the AF assembly in the optical axis direction with respect to the image sensor.

16. The photographing apparatus of claim 15,
wherein the lens driving assembly comprises:
  a cam barrel comprising an opening and being rotated about the optical axis direction by a driving force transmitted from the motors,
  a front barrel accommodated in the cam barrel and moving the AF assembly in the optical axis direction in correspondence to the rotation of the cam barrels, and
  a first lens group assembly rotating between a home position separated from the optical axis direction and an alignment position arranged on the optical axis direction, and
wherein the first lens group assembly is moved between the home position and the alignment position through the opening by the rotation of the cam barrel and an elastic force.

* * * * *